(12) United States Patent
Numoto et al.

(10) Patent No.: US 7,600,783 B2
(45) Date of Patent: Oct. 13, 2009

(54) GAS GENERATOR

(75) Inventors: Kenji Numoto, Tatsuno (JP); Eiichi Ryobo, Tatsuno (JP); Masayuki Yamazaki, Tatsuno (JP)

(73) Assignee: Daicel Chemical Industries, Ltd., Sakai-Shi, Osaka (JP)

( * ) Notice: Subject to any disclaimer, the term of this patent is extended or adjusted under 35 U.S.C. 154(b) by 361 days.

(21) Appl. No.: 11/481,053

(22) Filed: Jul. 6, 2006

(65) Prior Publication Data

US 2007/0013179 A1 Jan. 18, 2007

Related U.S. Application Data

(60) Provisional application No. 60/698,484, filed on Jul. 13, 2005.

(30) Foreign Application Priority Data

Jul. 8, 2005 (JP) .............................. 2005-199727

(51) Int. Cl.
B60R 21/26 (2006.01)
(52) U.S. Cl. ........................ 280/741; 280/736; 280/740; 280/742
(58) Field of Classification Search ................. 280/736, 280/740, 741, 742, 743.1
See application file for complete search history.

(56) References Cited

U.S. PATENT DOCUMENTS

| 4,001,750 | A | 1/1977 | Scherer et al. | |
| 4,998,751 | A * | 3/1991 | Paxton et al. | 280/741 |
| 5,934,705 | A | 8/1999 | Siddiqui et al. | |
| 6,464,254 | B2 * | 10/2002 | Chikaraishi et al. | 280/741 |
| 6,485,051 | B1 * | 11/2002 | Taguchi et al. | 280/736 |
| 6,547,277 | B1 * | 4/2003 | Adamini et al. | 280/741 |
| 6,547,477 | B1 | 4/2003 | Huber et al. | |
| 6,805,377 | B2 | 10/2004 | Krupp et al. | |
| 7,097,203 | B2 | 8/2006 | Burns et al. | |
| 7,192,055 | B2 | 3/2007 | Stevens et al. | |
| 2005/0104349 | A1 | 5/2005 | Stevens et al. | |

FOREIGN PATENT DOCUMENTS

| EP | 0382552 A2 | 8/1990 |
| JP | 3-548 A | 1/1991 |
| JP | 11-91494 A | 4/1999 |
| JP | 2002-537178 A | 11/2002 |
| WO | WO-00/50274 A1 | 8/2000 |

* cited by examiner

Primary Examiner—Paul N. Dickson
Assistant Examiner—Barry Gooden, Jr.
(74) Attorney, Agent, or Firm—Birch, Stewart, Kolasch & Birch, LLP

(57) ABSTRACT

A gas generator that can prevent erroneous operation in which the combustion of a gas generating agent inside one combustion chamber is caused by the combustion of a gas generating agent in the other combustion chamber. Two combustion chambers 30, 50 are separated by a partition wall 35. The partition wall 35 is fixed by discontinuous protrusions 61, 62 formed in a housing 11. Air tightness between two combustion chambers 30, 50 is ensured by two retainers 80, 90.

17 Claims, 4 Drawing Sheets

GAS GENERATOR

This nonprovisional application claims priority under 35 U.S.C. § 119(a) on Patent Application No. 2005-199727 filed in Japan on Jul. 8, 2005 and 35 U.S.C. § 119(e) on U.S. Provisional Application No. 60/698,484 filed on 13 Jul. 2005, which are incorporate by reference.

BACKGROUND OF THE INVENTION

1. Field of Invention

The present invention relates to a gas generator for an air bag used in an air bag system of an automobile.

2. Description of Related Art

Dual-type gas generators have been used to adjust the deployment speed and intensity of tension of an air bag according to the level of impact during vehicle collision or to the physical build of an occupant.

In the dual-type gas generators, the amount of generated gas and the speed and amount of gas discharge into the air bag are adjusted and the degree of air bag deployment is controlled, for example, by actuating two combustion chambers (gas generation units) independently. Accordingly, the gas generating agents in each combustion chambers have to be partitioned to prevent them from being burnt by the ignition of the gas generating agent in another combustion chamber.

U.S. Pat. No. 6,547,277 discloses an invention with respect to a gas generator for an air bag. According to that invention, a partition wall 20 is disposed almost in the center of an elongated housing to obtain a structure in which two combustion chambers are separated by the partition wall, and annular crimps 62 are formed on both sides of the partition wall in order to fix the partition wall and also maximize the sealing performance against the combustion chamber on the opposite side.

SUMMARY OF THE INVENTION

The invention provides a gas generator for an air bag, comprising:

a cylindrical housing, two combustion chambers provided in the housing and being axially adjacent to each other, a partition wall separating the two combustion chambers, an ignition device and a gas generating agent stored in each of the combustion chambers, a gas discharge port provided at each of the combustion chambers, two rows of plural projections which are formed discontinuously in the circumferential direction with intervals on the inner surface of the cylindrical housing and that holds and fixes the partition wall, a retainer press-inserted into at least one of the two combustion chambers, a wall surface section of the retainer abutting against the inner circumferential surface of the cylindrical housing so that the two combustion chambers are separately air-sealed.

In other words, the invention provides a gas generator in which two combustion chambers which are separated by a partition wall and adjacent in an axial direction are disposed inside a cylindrical housing, ignition device and a gas generating agent are accommodated in the two combustion chambers respectively, and each of the two combustion chambers has a gas discharge port, the partition wall is sandwiched between and fixed by a plurality of protrusions formed in two rows discontinuously with a intervals in the circumferential direction on the inner surface of the cylindrical housing, and a retainer is press fitted inside at least one combustion chamber of the two combustion chambers, and the two combustion chambers are separated in an air-tight state by bringing a wall surface having the retainer into contact with the inner circumferential surface of the cylindrical housing.

The invention provides, in other words, a gas generator for an air bag, comprising:

a cylindrical housing defining therein a combustion chamber and including two rows of plurality of projections formed discontinuously in a circumferential direction with intervals formed thereon and projected inwardly, the cylindrical housing further including a plurality of gas discharging ports:

a partition wall provided within the cylindrical housing and separating the combustion chamber into a first combustion chamber and a second combustion chamber, the partition wall is fixed to the cylindrical housing by the two rows of plurality of projections;

an ignition device provided within the first combustion chamber;

a gas generating agent provided within the first combustion chamber and the second combustion chamber; and a retainer press-inserted into the first combustion chamber, the retainer including a peripheral wall section abutting against an inner circumferential surface of the cylindrical housing and the first combustion chamber is sealed from the second combustion chamber.

BRIEF DESCRIPTION OF THE DRAWINGS

The present invention will become more fully understood from the detailed description given hereinbelow and the accompanying drawings which are given by way of illustration only, and thus are no limitative of the present invention and wherein.

DETAILED DESCRIPTION OF THE INVENTION

Figure 1:
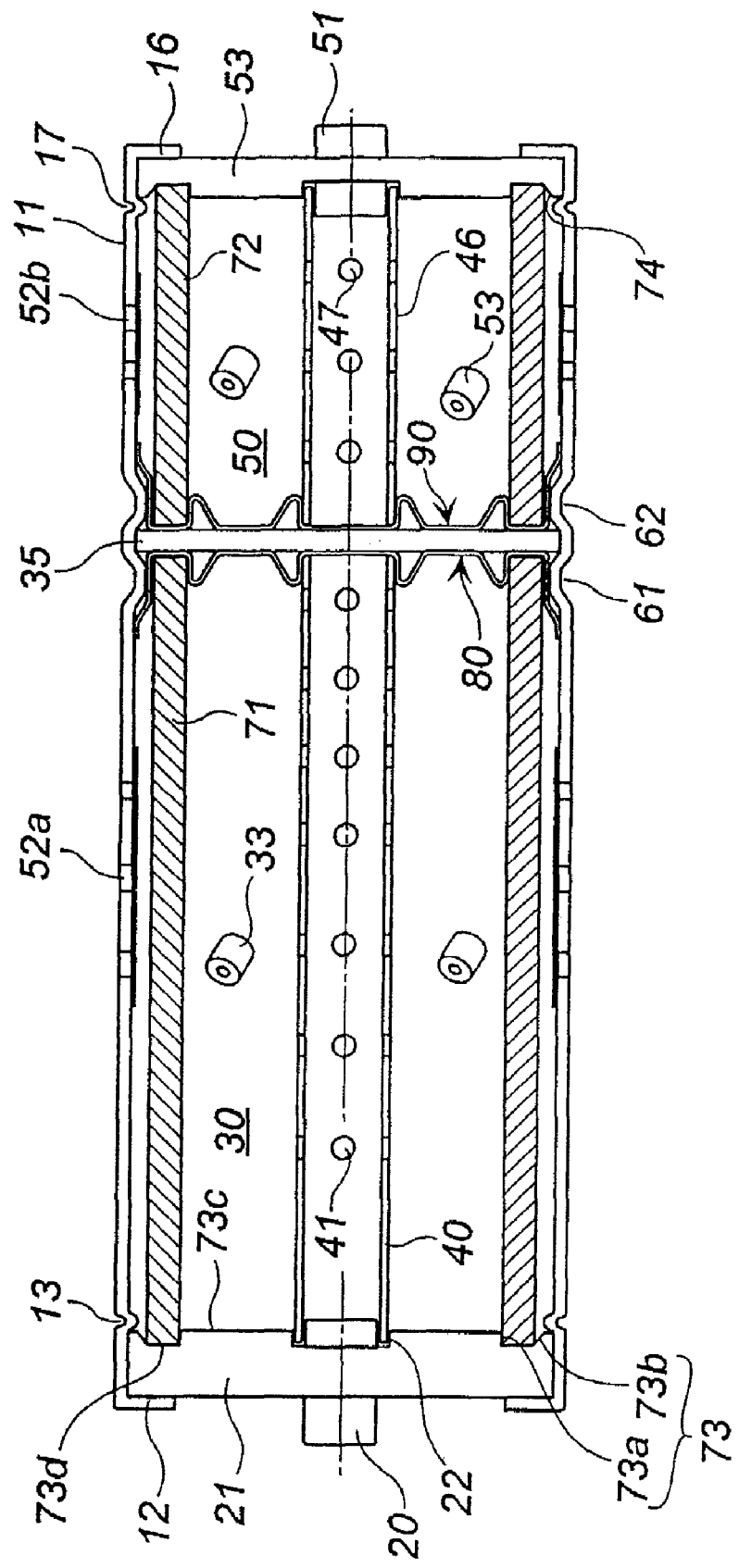
FIG. 1 shows a cross-sectional view in the axial direction of the gas generator in accordance with the present invention.

The present invention relates to a dual-type gas generator for an air bag which can be easily assembled and prevents an erroneous actuation by which a gas generating agent in a combustion chamber is burnt by the combustion of a gas generating agent in the other combustion chamber.

In the gas generator in accordance with the present invention, a fixing structure for fixing the partition wall and a sealing member for maintaining an air-tight state between the two combustion chambers, that is, the sealing member for preventing the actuation of one combustion chamber (a gas generating agent is ignited and burnt and a high-temperature gas is generated by the actuation of an ignition device) from affecting the other combustion chamber (the high-temperature gas generated in one combustion chamber does not flow into the other combustion chamber) are provided separately.

The fixing structure for fixing the partition wall, which separates the two combustion chambers, is a plurality of protrusions formed in two rows in the circumferential direction, and those protrusions are formed with intervals in the circumferential direction so as to abut against both peripheral edge sections of the partition wall. Therefore, by contrast with the crimps of the invention of U.S. Pat. No. 6,547,277, the protrusions are formed discontinuously. As a result, though a plurality of protrusions serve to fix the partition wall, they do not function to ensure the air-tight state between the two combustion chambers. When the partition wall is fixed with such discontinuous protrusions, the technical difficulties of forming the crimps continuously as in the invention of U.S. Pat. No. 6,547,277 are resolved and the risk of the strains, etc., occurring in the housing is eliminated.

A plurality of protrusion are protrusions, projecting inward the cylindrical housing, formed by applying external pressure to the cylindrical housing and forming recesses therein. Therefore, when viewed from the inner surface of the cylindrical housing, they appear to be the protrusions, but when viewed form the outer surface, they are recesses (concave sections) or grooves.

The discontinuous protrusions are not the protrusions formed to have an annular shape. For example, when four protrusions are provided on the inner circumferential surface, the portions where the protrusions have not been formed exists in four locations. Thus, intervals exist between the protrusions formed in the circumferential direction, and those portions are substantially not deformed inwardly (non-deformed portions).

The two rows of protrusions arranged with intervals serves to fix the partition wall by sandwiching it from both sides in the thickness direction when the partition wall is fixed by two protrusions.

The number of protrusions in one row is preferably 4-8, more preferably 4 or 6. The numbers of protrusions in the two rows may be the same or different.

The length of the protrusions in the circumferential direction may be the same for all the protrusions or may be different for each protrusion. More specifically, the length of protrusion differs depending on the diameter (length of circumference) of the cylindrical housing, but is preferably 10-40 mm, more preferably 25-35 mm when the outer diameter of the cylindrical housing is 50 mm. The length of protrusions in the two rows may be the same or different.

The protrusions may have any height, provided that they can fix the partition wall, but from the standpoint of avoiding the interference when a filter is used, if necessary, the height of the protrusions can be set to about the distance between the filter and the gas discharge port. The height of protrusions in the two rows may be the same or different.

The intervals (that is, the length of the non-deformed portions in the circumferential direction) between the protrusions can be 4-10 mm, but also can be 4-8 mm. For the pressure in the combustion chamber that is generated by the usual use, if the intervals between the protrusions is 4 mm or more, then discontinuous protrusions can be formed and, therefore, sufficient "clearance" can be ensured, and if the upper limit is 10 mm or less, the fixing strength for the partition wall is increased. However, the length of non-deformed portions or the depth of protrusions is related to the fixing strength of partition wall, and because it depends on the pressure during combustion, the numerical values presented above are merely examples and the depth of protrusions and intervals between the protrusions can be adjusted by the combustion pressure. The length of protrusions or the intervals between the protrusions in two rows may be the same or different.

The sealing means for maintaining an air-tight state between the two combustion chambers is a retainer press-fitted into at least one combustion chamber, and the air-tight state is maintained by abutting the wall surface of the retainer against the inner circumferential surface of the cylindrical housing. Furthermore, the retainer may have any shape that can be press-fitted into the combustion chamber, that is, a shape such that the wall surface of the retainer can push against the inner circumferential surface of the cylindrical housing.

The present invention relates to the gas generator, wherein the retainer is disposed inside the combustion chamber that is to be actuated first or in both combustion chambers.

A gas generator having two combustion chambers is operated in three modes in order to restrain and protect an occupant adequately according to the degree of automobile collision (degree of impact received by the occupant): the two combustion chambers are actuated simultaneously; one of the combustion chambers is actuated first and then the second combustion chamber is actuated with a certain delay; only one combustion chamber is actuated (in order to ensure safety during vehicle disassembly, the other combustion chamber is also actuated at a point in time unrelated to the occupant restraint). For this reason, from the standpoint of preventing the actuation of one combustion chamber from affecting the other combustion chamber, it is preferred that the retainer be press-fitted into the combustion chamber that is actuated first or into both combustion chambers.

The present invention relates to the gas generator, wherein the retainer has a disk section and an outer peripheral wall section formed integrally with the disk section, the disk section abuts against the partition wall, and the end section of the outer peripheral wall section on the opposite side of the disk section is disposed so as to be pressed against at least an inner circumferential surface of the cylindrical housing.

The outer peripheral wall section of the retainer preferably has a first outer peripheral wall extending in the vertical direction from the disk section and a second outer peripheral wall formed concentrically on the outside of the first outer peripheral wall. The first outer peripheral wall and second outer peripheral wall may be assembled as two vertical walls via a step section, or the second outer peripheral wall may be formed obliquely and outwardly from the first outer peripheral wall.

Here, the diameter of the disk section is of the same order as the diameter of the first outer peripheral wall, but the diameter (the maximum diameter) of the second outer peripheral wall is larger than the diameter of the first outer peripheral wall. Setting the diameter (the maximum diameter) of the second outer peripheral wall section also slightly larger than the inner diameter of the cylindrical housing makes it possible to press-fit the retainer and the inner peripheral surface of the housing can be pressed by the outer peripheral wall section of the retainer.

Furthermore, because the outer side of the second outer peripheral wall presses the inner circumferential surface of the housing, sealing ability is also ensured. The second outer peripheral wall section has elasticity enabling it to be press-fitted into the housing, and because the second outer peripheral wall section is further pressed against the inner circumferential surface of the housing by the pressure during actuation, the sealing ability is enhanced.

The retainer can be made from a metal (for example, stainless steel) with a thickness of about 0.3-1.0 mm having elasticity and strength.

The present invention relates to the gas generator, wherein a cylindrical filter is disposed in each of the two combustion chambers, and at least one of the cylindrical filters is positioned by a protrusion formed in the retainer.

The filter is a component having a filtering function and a cooling function for the combustion gas generated by the combustion of the gas generating agent. It is preferred that a gap be provided between the filter and the gas discharge port provided in the cylindrical housing in order to facilitate the discharge of the gas. Accordingly, when the filter is disposed so as to provide a gap between the filter and the gas discharge port, positioning the filter is important, and if the retainer, which serves to ensure the air tightness between the two combustion chamber, is used for positioning the filter, the filter can be positioned in a simple manner, without increasing the number of components.

The filter used can have a cylindrical shape obtained by stacking a plurality of coarse-mesh wire meshes (for example, a press-molded mesh filter formed by using a wire mesh or metal wire rod such as a plain weave, an expanded metal, a punched metal, or a lath metal).

The present invention relates to the gas generator, wherein a flame transmission tube for transmitting ignition energy generated from the ignition device is disposed in at least one of the two combustion chambers, and an opening portion at one end of the flame transmission tube is connected to the ignition device, and an opening portion at the other end of the flame transmission tube abuts against and is closed by the retainer and positioned by a protrusion provided in the retainer.

In the case of a cylindrical housing, the two combustion chambers are cylindrical. Therefore, of the gas generating agents loaded into the combustion chambers, one is in the position close to the ignition device (usually, an electric igniter or an assembly of an electric igniter and a transfer charge) and one is in the position far therefrom. In such case, the gas generating agent located in the position close to the ignition device is easy to be burnt and the gas generating agent in the position far from the ignition device is difficult to be burnt. Therefore, it is important to dispose a flame transmission tube for transmitting the ignition energy into the combustion chamber and to ensure good ignition of the gas generating agent, regardless of the distance from the ignition device. For this reason, positioning the flame transmission tube is also important, and when the retainer, which serves to ensure the air tightness between two combustion chambers, is used for positioning the flame transmission tube, the flame transmission tube is positioned in easier manner, without increasing the number of components.

Furthermore, the opening portion on the other end of the flame transmission tube may abut against the retainer correspondingly to the retainer shape, or may abut against the partition wall.

With the gas generator in accordance with the present invention, the fixing structure for the partition wall that separates the two combustion chambers and the retainer separating the two combustion chambers in an air-tight state prevent the actuation of one combustion chamber from affecting the other combustion chamber.

EMBODIMENTS OF THE INVENTION

Figure 2:
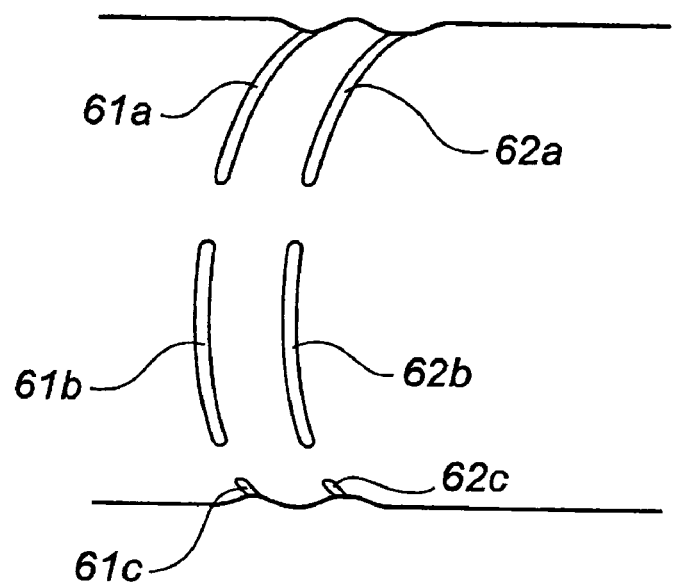
FIG. 2 is a partial perspective view of the gas generator shown in FIG. 1.
Figure 3:
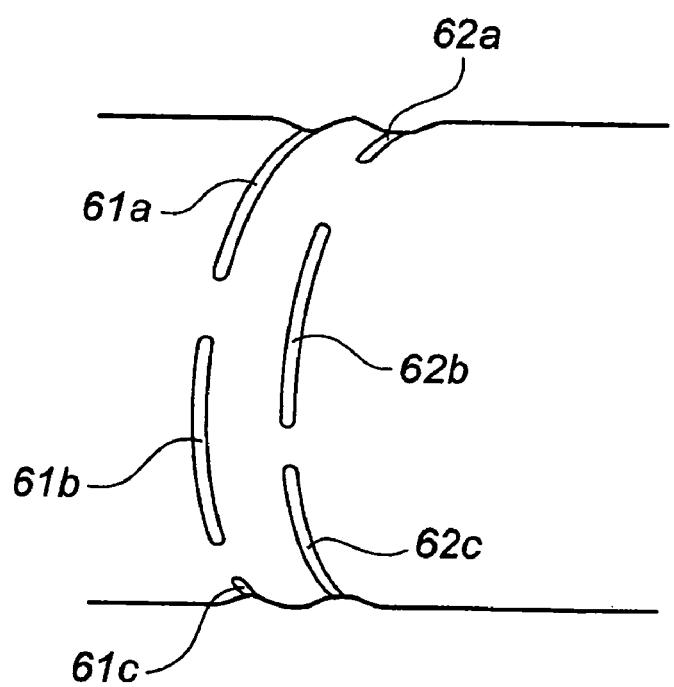
FIG. 3 is a partial perspective view of the gas generator of another embodiment.
Figure 4:
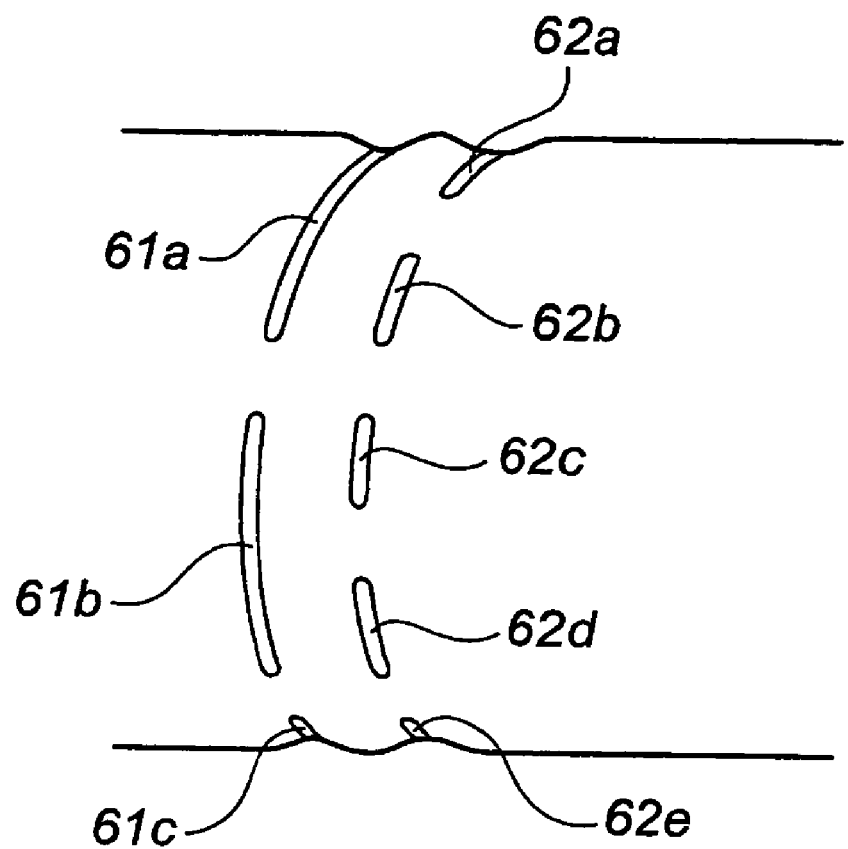
FIG. 4 is a partial perspective view of the gas generator of another embodiment.
Figure 5:
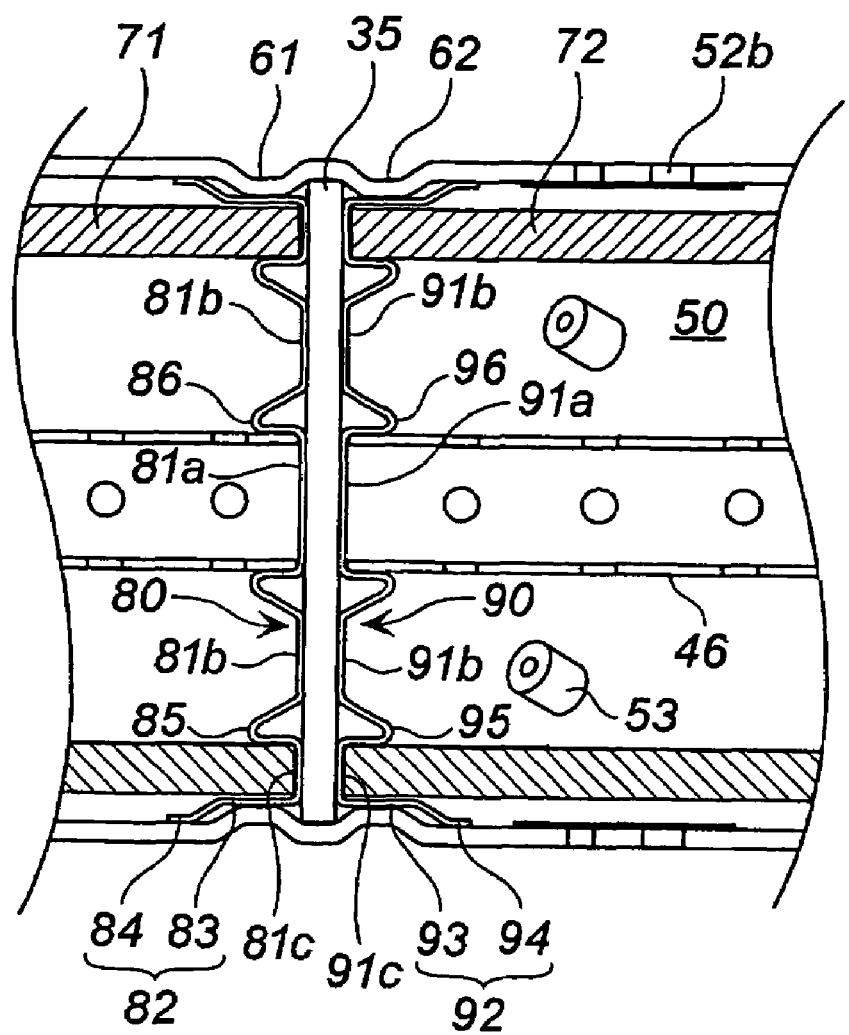
FIG. 5 is a partial enlarged cross-sectional view of the gas generator shown in FIG. 1.

A gas generator in accordance with the present invention will be explained below with reference to FIGS. 1 to 5. FIG. 1 is a cross-sectional view in the axial direction. FIGS. 2 to 4 are partial perspective views (including different embodiments) of the configuration shown in FIG. 1. FIG. 5 is a partial enlarged cross-sectional view of the configuration shown in FIG. 1. The gas generator 10 shown in FIG. 1 is to be employed in an air bag system, which is a passenger restraining device for a vehicle and is especially suitable for a gas generator for an air bag for a front passenger side.

A first igniter 20 and a first combustion chamber 30 are disposed at one end side inside a cylindrical housing 11. The internal cross-sectional shape in the width direction of the cylindrical housing 11 is not limited to a circle and may be elliptical or polygonal.

The first igniter 20 is mounted on a disk-like first collar 21. The first collar 21 is fixed with a crimped portion 12 on the peripheral edge of the end section of the cylindrical housing 11 and an annular protruding portion (it is not a complete annular or it is not continuous) 13. A groove can be provided in the outer peripheral portion of the first collar 21, and an O-ring for ensuring moisture proofing can be disposed therein to be held between the first collar and the inner circumferential surface of the housing.

A first flame transmission tube 40 is disposed inside the first combustion chamber 30, and a molded article of a gas generating agent (used as a transfer charge) molded to the desired shape and having a combustion temperature of 1700-3000° C. or a well-known transfer charge such as $B/KNO_3$ is accommodated inside the first flame transmission tube.

A plurality of flame transmission nozzles 41 are formed on the circumferential wall surface of the first flame transmission tube 40. The flame transmission nozzles 41 are closed with an aluminum tape or the like, but it is also possible that the transfer charge is charged in an aluminum canister or the like and the canister is disposed inside the first flame transmission tube 40.

A first gas generating agent 33 having a combustion temperature lower than that of the gas generating agent disposed in the first flame transmission tube 40 is accommodated in the first combustion chamber 30.

A second igniter 51 and a second combustion chamber 50 are disposed at the other end side of the cylindrical housing 11. Similar to the first combustion chamber 30, the second igniter 51 is fixed to the second collar 53 and the second collar is fixed with a crimped section 16 on the peripheral edge of the end portion of the cylindrical housing 11 and an annular protruding portion (it is not a complete annular or it is not continuous) 17. An O-ring can be disposed in the second collar 53 in the same manner as in the first collar 21.

A second flame transmission tube 46 is disposed inside the second combustion chamber 50, and a molded article of a gas generating agent (used as a transfer charge) molded to the desired shape and having a combustion temperature of 1700-3000° C. or a well-known transfer charge such as $B/KNO_3$ is accommodated inside the second flame transmission tube. A plurality of flame transmission nozzles 47 are formed on the circumferential wall surface of the second flame transmission tube 46. The flame transmission nozzles 47 are closed with an aluminum tape or the like, but it is also possible that the transfer charge is accommodated in an aluminum canister or the like and the canister is disposed inside the second flame transmission tube 46. An opening at one end side of the second flame transmission tube 46 is connected to the second igniter 51, and an opening at the other end side abuts against a first disk portion 91a of a second retainer 90.

A second gas generating agent 53 having a combustion temperature lower than that of the gas generating agent disposed in the second flame transmission tube 46 is accommodated in the second combustion chamber 50.

A partition wall 35 is disposed in the central portion of the cylindrical housing 11. The partition wall 35 is fixed with two rows of discontinuous protrusions 61, 62 formed in the circumferential direction of the cylindrical housing 11. The two rows of protrusions 61, 62 are obtained in such a way that the section, corresponding to both peripheral edges of the partition wall 35, in the outer surface of the cylindrical housing 11 is deformed to protrude inwardly.

An example of protrusions 61, 62 will be explained below with reference to FIGS. 2 to 4. Referring to FIG. 2, two rows of protrusions 61a, 61b, 61c (61d is on the rear side and cannot be seen) projected inwardly and protrusions 62a, 62b, 62c (62d is on the rear side and cannot be seen) projected inwardly are formed on the circumference of the cylindrical housing 11; the formation mode of the protrusion of the two rows is the same. Flat surfaces (curved surfaces of the housing) are provided between the protrusions, and the flat surface portions are neither deformed nor provided with inward protrusions.

The diameter of the cylindrical housing 11 is 50 mm (circumference is 157 mm), the height of protrusions (depth of protrusions) can be 1.5 mm, the length of protrusions can be about 32 mm, and the circumferential intervals between the protrusions can be 7 mm.

Referring to FIG. 3, two rows of protrusions 61a, 61b, 61c (61d is on the rear side and cannot be seen) projected inwardly and protrusions 62a, 62b, 62c (62d is on the rear side and cannot be seen) projected inwardly are formed on the circumference of the cylindrical housing 11. However, the formation modes of the protrusion of the two rows are different and the formation positions of the protrusions (that is, the positions where portions without protrusions are formed) are different. Flat surfaces (curved surfaces of the housing) are provided between the protrusions, and the flat surface portions are neither deformed nor provided with inward protrusions.

The diameter of the cylindrical housing 11 is 50 mm (circumference is about 157 mm), the height (depth), length, and intervals of protrusions can be the same as in the structure shown in FIG. 2.

Referring to FIG. 4, two rows of four protrusions 61a, 61b, 61c (61d is on the rear side and cannot be seen) projected inwardly and six protrusions 62a, 62b, 62c, 62d, 62e (62f is on the rear side and cannot be seen) projected inwardly are formed on the circumference of the cylindrical housing 11. Flat surfaces (curved surfaces of the housing) are provided between the protrusions, and the flat surface portions are neither deformed nor provided with inward protrusions.

The diameter of the cylindrical housing 11 is 50 mm (circumference is about 157 mm), the height (depth), length, and intervals of protrusions 61a-61d can be the same as in the structure shown in FIG. 2.

The diameter of the cylindrical housing 11 is 50 mm (circumference is 157 mm), the height (depth) of protrusions 62a-62f can be 1.5 mm, the length can be 20 mm, and the intervals between the protrusions can be 6 mm.

A first retainer 80 such as shown in FIG. 5 is disposed in the first combustion chamber 30. The first retainer 80 has a disk section 81 and an outer peripheral wall section 82. The outer peripheral wall section 82 has a vertical wall section (first outer peripheral wall) 83 and an expansion section (second peripheral wall) 84 expanding outwardly from the vertical wall section 83.

The disk section 81 is provided with an outer annular protruding section 85 and an inner annular protruding section 86. A portion surrounded by the inner annular protruding section 86 serves as a first disk section 81a. A portion surrounded by the outer annular protruding section 85 and inner annular protruding section 86 serves as a second disk section 81b, and a portion surrounded by the outer annular protruding section 85 and outer peripheral wall section 82 serves as a third disk section 81c. The first disk section 81a, second disk section 81b, and third disk section 81c abut against the partition wall 35.

The outer diameter of the expansion section 84 is set larger than the inner diameter of the cylindrical housing 11. Therefore, the first retainer 80 can be press-fitted into the cylindrical housing 11 and the expansion section 84 presses against the inner surface of the cylindrical housing 11. With consideration for the height of the protrusion 61, the outer diameter of the vertical wall section 83 is determined so as not to interfere with the protrusion 61.

A second retainer 90 such as shown in FIG. 5 is disposed in the second combustion chamber 50. The second retainer 90 has a disk section 91 and an outer peripheral wall section 92. The outer peripheral wall section 92 has a vertical wall section 93 and an expansion section 94 expanding outwardly from the vertical wall section 93.

The disk section 91 is provided with an outer annular protruding section 95 and an inner annular protruding section 96. A portion surrounded by the inner annular protruding section 96 serves as a first disk section 91a. A portion surrounded by the outer annular protruding section 95 and inner annular protruding section 96 serves as a second disk section 91b, and a portion surrounded by the outer annular protruding section 95 and outer peripheral wall section 92 serves as a third disk section 91c. The first disk section 91a, second disk section 91b, and third disk section 91c abut against the partition wall 35.

The outer diameter of the expansion section 94 is set larger than the inner diameter of the cylindrical housing 11. Therefore, the second retainer 90 can be press-fitted into the cylindrical housing 11 and the expansion section 94 presses against the inner surface of the cylindrical housing 11. With consideration for the height of the protrusion 62, the outer diameter of the vertical wall section 93 is determined so as not to interfere with the protrusion 62.

A first cylindrical filter 71 is disposed in the axial direction of the housing in the first combustion chamber 30. A plurality of gas discharge ports 52a are provided in the wall surface of the cylindrical housing 11 facing the first filter 71. The gas discharge ports 52a are sealed from inside with a seal tape.

One end of the first filter 71 is fitted into a concave section 73 of the first collar 21. More specifically, the concave section 73 formed in the first collar 21 has an inner step portion 73a and an outer step portion 73b. The inner step portion 73a abuts against one end of the inner peripheral surface of the filter 71, has a function of positioning the filter 71 when the gas generator is assembled, and also prevents short-pass of the generated combustion gas between the one end of the filter and the first collar 21.

In the structure shown in FIG. 1, the outer step section 73b is formed to have a tapered shape, and because a surface thereof abuts against the outer peripheral surface of one end of the first filter 71, similarly to the inner step section 73a, the effect of preventing short-pass of the combustion is further improved. In other words, such a structure is obtained: Discontinuous surfaces (73c and 73d) are formed on part of the surface of the first collar, which abuts against the one end of the first filter; At least one of the inner peripheral surface and outer peripheral surface of the end section of the first filter is in contact with the discontinuous surfaces. With this structure, short-pass of a combustion gas at the end section of the first filter is prevented.

On the other hand, the opposite end section abuts against the third disk section 81c and is surrounded by the outer annular protruding section 85 and outer peripheral wall section 82. Therefore, at the opposite end section of the first filter, positioning of the first filter 71 is facilitated and short pass of the combustion gas from the opposite end section of the first filter 71 is prevented.

An opening portion at one end of the first flame transmission tube 40 is fitted into the concave section 22 formed in the first collar 21. The concave section 22 is formed to have an inner diameter corresponding to the outer diameter of the first flame transmission tube 40 and the two components are preferably tightly fixed. On the other hand, the opposite end section is fixed with the inner annular protruding section 86. Because the inner diameter of the inner annular protruding section 86 corresponds to the outer diameter of the first flame transmission tube 40, the first flame transmission tube 40 can be tightly fixed.

By fixing and positioning the first flame transmission tube 40 in the above-described manner, the combustion gas inside the first flame transmission tube 40 can be also prevented from short-passing between the first collar 21 or retainer 80 and first flame transmission tube 40 when the molded article of a gas generating agent (used as a transfer charge) located inside the first flame transmission tube 40 is burnt and a high pressure is attained inside the first flame transmission tube 40.

A second filter 72 is positioned and fixed in the same manner as the first filter 71, and the second flame transmission tube 46 is positioned and fixed in the same manner as the first flame transmission tube 40.

In the second combustion chamber 50, the second cylindrical filter 72 is disposed in the axial direction of the housing. A plurality of gas discharge ports 52b are provided in the wall surface of the cylindrical housing 11 facing the second filter 72. The gas discharge ports 52b are sealed from inside with a seal tape.

One end of the second filter 72 is fitted into a concave section 74 of the second collar 53, the opposite end section abuts against the third disk section 91c, and the end section is surrounded by the outer annular protruding section 95 and outer peripheral wall section 92. As a result, the second filter 72 can be easily positioned and short-pass of the combustion gas from the end section of the second filter 72 is prevented.

The operation of the gas generator 10 assembled in an air bag system of an automobile will be described below based on FIG. 1. In the case explained hereinbelow, the first igniter 20 and second igniter 51 are actuated simultaneously.

When a vehicle is collided, the first igniter 20 is actuated, the transfer charge is ignited and burnt and combustion energy (high-temperature gas and flame) is generated. The combustion energy flows from the flame transmission nozzle 41 into the first combustion chamber 30, causing ignition and combustion of the first gas generating agent 33.

The combustion gas generated by combustion of the first gas generating agent 33 is cooled and combustion residues remaining therein are filtered out when the combustion gas passes through the first filter 71. The combustion gas then ruptures the seal tape and is discharged from the gas discharge ports 52a, inflating the air bag.

In such discharge process of the combustion gas, the expansion section 84 of the first retainer 80 is strongly pressed against the inner surface of the housing 11 by the pressure generated in the first combustion chamber 30. As a result, no gap is produced at the contact surface. Therefore, short pass (leak into the second combustion chamber 50) of the combustion gas is prevented.

On the other hand, when the second igniter 51 is actuated simultaneously with the first igniter 20, the transfer charge is ignited and burnt and combustion energy (high-temperature gas and flame) is generated. This combustion energy flows from the flame transmission nozzle 47 into the second combustion chamber 50, causing ignition and combustion of the second gas generating agent 53.

The combustion gas generated by combustion of the second gas generating agent 53 is cooled and combustion residues remaining therein are filtered out when the combustion gas passes through the second filter 72. The combustion gas then ruptures the seal tape and is discharged from the gas discharge ports 52b, further inflating the air bag.

In such discharge process of the combustion gas, the expansion section 94 of the second retainer 90 is strongly pressed against the inner surface of the housing 11 by the pressure generated in the second combustion chamber 50. As a result, no gap is produced at the contact surface. Therefore, short pass of the combustion gas (leak into the first combustion chamber 30) is prevented.

When the first igniter 20 is actuated before the second igniter, short pass of the combustion gas (leaking into the second combustion chamber 50) can be prevented, in the same manner as in the case of simultaneous actuation. Furthermore, when the first igniter 20 is actuated before the second igniter, only the internal pressure of the first combustion chamber 30 rises and the second combustion chamber 50 remains under a normal pressure, but because the partition wall 35 is fixed by two rows of protrusions 61, 62, the partition wall does not move due to the pressure of the first combustion chamber 30.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A gas generator for an air bag, comprising:
   a cylindrical housing;
   two combustion chambers provided in the housing and being adjacent to each other in an axial direction of the cylindrical housing;
   a partition wall separating the two combustion chambers;
   an ignition device and a gas generating agent stored in each of the combustion chambers;
   a gas discharge port provided at each of the combustion chambers;
   two rows of plural projections which are formed discontinuously in a circumferential direction with intervals on the inner surface of the cylindrical housing and that holds and fixes the partition wall; and
   a retainer press-inserted into at least one of the two combustion chambers, the retainer including a peripheral wall section having a first peripheral wall and a second peripheral wall, having a diameter larger than the first peripheral wall, that abuts an inner circumferential surface of the cylindrical housing, such that the two combustion chambers are separately air-sealed.

2. The gas generator according to claim 1, wherein the retainer is disposed inside the combustion chamber that is to be actuated first.

3. The gas generator according to claim 1, wherein the retainer has a disk section, formed integrally with the first peripheral wall, that abuts against the partition wall.

4. The gas generator according to claim 1, further comprising:
a cylindrical filter disposed in each of the two combustion chambers, and at least one of the cylindrical filters being supported and positioned by a first protrusion formed in the retainer.

5. The gas generator according to claim 1 or 2, further comprising:
a flame transmission tube for transmitting ignition energy generated from the ignition device is disposed in at least one of the two combustion chambers,
wherein an opening portion at one end of the flame transmission tube is connected to the ignition device, and an opening portion at the other end of the flame transmission tube abuts against and is closed by the retainer and positioned by a second protrusion provided in the retainer.

6. The gas generator according to claim 1, wherein the retainer is disposed inside both of the two combustion chambers.

7. The gas generator according to claim 1, wherein the retainer has a disk section and a protruding section formed integrally with the peripheral wall section, the protruding section including an inner annular protruding section and an outer annular protruding section, and the disk section including a first disk portion surrounded by the inner annular protruding section, a second disk section defined between the inner annular protruding section and the outer annular protruding section, and a third disk section defined between the outer annular protruding section and the first peripheral wall.

8. The gas generator according to claim 7, further comprising;
a cylindrical filter disposed in each of the two combustion chambers, one end of at least one of the cylindrical filters being supported and positioned by being inserted in the third disk section.

9. The gas generator according to claim 7, further comprising:
a flame transmission tube for transmitting ignition energy generated from the ignition device is disposed in at least one of the two combustion chambers,
wherein an opening portion at one end of the flame transmission tube is connected to the ignition device, and an opening portion at the other end of the flame transmission tube is supported and position by being inserted in the first disk portion.

10. A gas generator for an air bag, comprising:
a cylindrical housing defining therein a combustion chamber and including two rows of plurality of projections formed discontinuously in a circumferential direction with intervals formed thereon and projected inwardly, the cylindrical housing further including a plurality of gas discharging ports;
a partition wall provided within the cylindrical housing and separating the combustion chamber into a first combustion chamber and a second combustion chamber, the partition wall being fixed to the cylindrical housing by the two rows of plurality of projections;
an ignition device provided within each of the first combustion chamber and the second combustion chamber;
a gas generating agent provided within the first combustion chamber and the second combustion chamber; and
a retainer press-inserted into the first combustion chamber, the retainer including a peripheral wall section including a first peripheral wall and a second peripheral wall, having a diameter larger than the first peripheral wall, that abuts an inner circumferential surface of the cylindrical housing, such that the first combustion chamber is sealed from the second combustion chamber.

11. The gas generator according to claim 10, wherein the first combustion chamber is actuated prior to the second combustion chamber.

12. The gas generator according to claim 10, wherein the retainer has a disk section, formed integrally with the first peripheral wall, that abuts against the partition wall.

13. The gas generator according to claim 10, further comprising;
a filter disposed in the first combustion chamber, the filter being supported and positioned by a first protrusion formed in the retainer.

14. The gas generator according to claim 10, wherein a flame transmission tube for transmitting ignition energy generated from the ignition device is disposed in the first combustion chamber, and
an opening portion at one end of the flame transmission tube is closed by the ignition device, and an opening portion at the other end of the flame transmission tube abuts against and is closed by the retainer and positioned by a second protrusion provided in the retainer.

15. The gas generator according to claim 10, wherein the retainer has a disk section and a protruding section formed integrally with the peripheral wall section, the protruding section including an inner annular protruding section and an outer annular protruding section, and the disk section including a first disk portion surrounded by the inner annular protruding section, a second disk section defined between the inner annular protruding section and the outer annular protruding section, and a third disk section defined between the outer annular protruding section and the first peripheral wall.

16. The gas generator according to claim 15, further comprising;
a cylindrical filter disposed in the combustion chamber, one end of the cylindrical filter being supported and positioned by being inserted in the third disk section.

17. The gas generator according to claim 15, further comprising;
a flame transmission tube for transmitting ignition energy generated from the ignition device is disposed in the combustion chamber,
wherein an opening portion at one end of the flame transmission tube is connected to the ignition device, and an opening portion at the other end of the flame transmission tube is supported and position by being inserted in the first disk portion.

* * * * *